United States Patent
Yamazaki et al.

(10) Patent No.: US 10,701,939 B2
(45) Date of Patent: Jul. 7, 2020

(54) AQUEOUS SUSPENSION AGROCHEMICAL COMPOSITION

(71) Applicants: KUMIAI CHEMICAL INDUSTRY CO., LTD., Tokyo (JP); NIPPON SODA CO., LTD., Tokyo (JP)

(72) Inventors: Toshinobu Yamazaki, Tokyo (JP); Toshio Sugimura, Tokyo (JP); Koichi Ozaki, Tokyo (JP)

(73) Assignees: KUMIAI CHEMICAL INDUSTRY CO., LTD., Tokyo (JP); NIPPON SODA CO., LTD., Tokyo (JP)

(*) Notice: Subject to any disclaimer, the term of this patent is extended or adjusted under 35 U.S.C. 154(b) by 0 days.

(21) Appl. No.: 15/777,978

(22) PCT Filed: Nov. 28, 2016

(86) PCT No.: PCT/JP2016/085218
§ 371 (c)(1),
(2) Date: May 22, 2018

(87) PCT Pub. No.: WO2017/094676
PCT Pub. Date: Jun. 8, 2017

(65) Prior Publication Data
US 2018/0343866 A1    Dec. 6, 2018

(30) Foreign Application Priority Data

Nov. 30, 2015   (JP) ................. 2015-234178

(51) Int. Cl.
| | | |
|---|---|---|
| A01N 47/12 | (2006.01) | |
| A01N 25/04 | (2006.01) | |
| A01N 25/30 | (2006.01) | |
| A01N 25/24 | (2006.01) | |

(52) U.S. Cl.
CPC ............. A01N 47/12 (2013.01); A01N 25/04 (2013.01); A01N 25/24 (2013.01); A01N 25/30 (2013.01); A01N 2300/00 (2013.01)

(58) Field of Classification Search
CPC .... A01N 25/04; A01N 2300/00; A01N 25/30; A01N 47/12; A01N 25/24
See application file for complete search history.

(56) References Cited

U.S. PATENT DOCUMENTS

| | | | |
|---|---|---|---|
| 5,037,653 A | 8/1991 | Dawson | |
| 6,812,229 B1* | 11/2004 | Ozaki | A01N 47/12 |
| | | | 514/238.8 |
| 2007/0166340 A1* | 7/2007 | Stringfellow | A01N 25/00 |
| | | | 424/405 |
| 2010/0204283 A1* | 8/2010 | Dairiki | A01N 25/30 |
| | | | 514/357 |
| 2011/0028521 A1 | 2/2011 | Morita et al. | |
| 2011/0233812 A1 | 9/2011 | Fujita et al. | |
| 2014/0163018 A1 | 6/2014 | Fukuchi et al. | |
| 2018/0332843 A1 | 11/2018 | Ohta et al. | |
| 2018/0352813 A1 | 12/2018 | Ohta et al. | |

FOREIGN PATENT DOCUMENTS

| | | |
|---|---|---|
| JP | 2-502821 | 9/1990 |
| JP | 2001-106666 | 4/2001 |
| JP | 2004-345981 | 12/2004 |
| JP | 2007-246496 | 9/2007 |
| JP | 2001-523690 | 11/2011 |
| JP | 2012-250920 | 12/2012 |
| WO | 99/26472 | 6/1999 |
| WO | 2010/064513 | 6/2010 |
| WO | 2017/094677 | 6/2017 |
| WO | 2017/094678 | 6/2017 |

OTHER PUBLICATIONS

International Search Report dated Feb. 21, 2017 in International Application No. PCT/JP2016/085218.
Kenichi Kida, "Agchem Age", No. 195, Nippon Soda Co., Ltd., Dec. 2013, pp. 12-17.
English language translation of the Written Opinion of the International Searching Authority, dated Feb. 21, 2017 in corresponding International Patent Application No. PCT/JP2016/085218.
Extended European Search Report dated Mar. 14, 2019 in corresponding European Patent Application No. 16870613.3.

\* cited by examiner

*Primary Examiner* — Johann R Richter
*Assistant Examiner* — Danielle Sullivan
(74) *Attorney, Agent, or Firm* — Wenderoth, Lind & Ponack, L.L.P.

(57) ABSTRACT

Provided is a pyribencarb aqueous suspension agrochemical composition which contains an adjuvant for reinforcing the efficacy of pyribencarb, and which is capable of preventing a pharmaceutical preparation from becoming highly viscous or solidified and capable of providing a sufficient controlling effect with a small amount of pyribencarb. The aqueous suspension agrochemical composition includes: pyribencarb which is an agrochemically active component; an adjuvant for pyribencarb, which is one or more compounds selected from polyoxyalkylene siloxanes, polyoxyethylene/polyoxypropylene block copolymers, and polyoxyalkylene alkyl ethers; a nonionic-anionic surfactant which is a polyoxyalkylene aryl ether sulfuric acid salt and/or a polyoxyalkylene aryl ether phosphoric acid salt; and water.

9 Claims, No Drawings

AQUEOUS SUSPENSION AGROCHEMICAL COMPOSITION

TECHNICAL FIELD

The present invention relates to an aqueous suspension agrochemical composition wherein pyribencarb as an agrochemically active component is suspended and dispersed in water. Especially, it relates to a pyribencarb aqueous suspension agrochemical composition which contains an adjuvant for reinforcing the efficacy of the pyribencarb, and which is capable of preventing its preparation from becoming highly viscous or solidified and capable of providing a sufficient controlling effect with a small amount of the pyribencarb.

BACKGROUND ART

Pyribencarb or methyl={2-chloro-5-[(E)-1-(6-methyl-2-pyridylmethoxyimino) ethyl]benzyl}carbamate, which is an agrochemically active component, is a known benzyl carbamate-based bactericide, which is disclosed in Patent Document 1 for the first time. Non Patent Document 1 discloses that it is characterized by having a wide range of control spectrum and exhibiting an excellent controlling effect on diseases of fruits and vegetables such as gray mold, crown rot, brown rot and the like, caused by various phytopathogenic fungi including ascomycetes.

It is known that a certain chemical substance which itself does not show an activity as an agrochemical agent may be applied, simultaneously or prior or after the application of the agrochemically active component to a useful plant such as a crop or a pest to be controlled, possibly resulting in enhanced efficacy of the agrochemically active component. The aforementioned chemical substance is called an adjuvant. In the broad sense, an adjuvant refers to an auxiliary agent in contrast to a main agent in pharmaceutics. In the field of agrochemical preparations, however, an auxiliary agent used for reinforcing the efficacy of an agrochemically active component is called an adjuvant. It is possible to achieve the desired controlling effect with a smaller amount of an agrochemically active component in combination with an adjuvant. Therefore, the use of the adjuvant meets the consumer trend towards reduced agrochemical usage. Moreover, the use of the adjuvant results in reduced cost for control and reduced environmental burden. Accordingly, the use of the adjuvant is a useful technology for application of agrochemicals.

The effectiveness of adjuvants on individual agrochemically active components is based on individual compatibility. Patent Document 2 discloses a paste-like agrochemical preparation in which pyribencarb and an adjuvant are blended, and enumerates examples of the adjuvant such as fatty acid polyhydric alcohol esters, polyalkylene oxide adducts of fatty acid polyhydric alcohol esters, polyalkylene oxide fatty acid esters, polyalkylene oxide lanolin, sorbitol lanolin derivatives, polyalkylene oxide bee wax, sorbitol be wax derivatives, polysaccharide derivatives, graft polymers of $C_8$ or higher alcohol, polyalkylene oxide, graft polymer of polyalkylene oxide, block polymers of polyalkylene oxide, and random polymers of polyalkylene.

The agrochemical formulation described in the Patent Document 2 is a paste-like composition which is applied exclusively to trees or the like by direct manual operation or directly filled in pores drilled into trees or the like. Therefore, its application is practically limited to fruit orchards, forestry and the like in which naturally vegetation is sparse and the planting area is small scale. For application of the adjuvant technology in the case of applying pyribencarb for a field of densely-planted vegetable or a large-scale agriculture with a large planting area, it is indispensable to be adapted to mechanized modern agriculture. For the purpose, the pyribencarb has to be diluted in water for spraying process, that is, the pyribencarb has to be formulated into an agrochemical preparation in the form applicable to spraying process. Needless to say, the paste-like agrochemical preparation is a highly viscous semi-solid composition suitable for coating treatment and the like, and it is not intended to be used for spraying process and does not have dilution performance inherently. Therefore, it is difficult to prepare a uniform spray solution, so it is not suitable for application by spraying process.

Typical examples of a method of treating a combination of pyribencarb and an adjuvant may include a method of separately spraying the adjuvant before or after the treatment with the pyribencarb, a method including mixing the adjuvant in situ at the time of preparing a spray solution of the pyribencarb. The former requires multiple spraying operations, and the latter requires labor to separately prepare the pyribencarb and adjuvant and subsequently weigh them separately, etc. Thus, both of them are not labor-saving. Therefore, an adjuvant-encapsulated formulation containing pyribencarb and an adjuvant in a single composition has been desired.

As a dosage form of the agrochemical composition capable of being sprayed, solid preparations such as wettable powders and water-dispersible granules, and liquid preparations such as aqueous suspensions and emulsifiable concentrates can be contemplated. Pyribencarb may be processed into any of the aforementioned types of preparations. On the other hand, when the adjuvant contained in the agrochemical composition containing the pyribencarb is a liquid within a normal temperature range or a low melting point substance even if it is a solid, it is expected to be difficult to blend the adjuvant into a solid preparation. Considering blending of adjuvants, liquid formulation will be a probable option. Furthermore, as long as the adjuvant is a substance which is easily soluble or dispersible in water, an aqueous liquid formulation represented by an aqueous suspension is the most suitable dosage form. The aqueous suspension is a liquid agrochemical preparation in which fine particles of an agrochemically active component relatively insoluble in water are suspended in water. It is a widely used form of preparation from the following reasons: there is no dusting at the time of use and there is less concern that a user is exposed to agrochemical preparations; it is easy to weigh; it is highly safe because it does not use an organic solvent which has adverse effects on the human body and the environment and has low flash point; and the like.

However, one of the problems of the preparation containing an adjuvant is that the excellent compatibility between an agrochemically active component and an adjuvant in terms of agrochemical activity does not necessarily indicate the physicochemical compatibility between the agrochemically active component and the adjuvant. Reinforcement of efficacy of the pyribencarb by such adjuvants is an appealing phenomenon, but there is no knowledge on a pyribencarb preparation in which pyribencarb and an adjuvant are packaged in a single composition to add high performance, and it is also difficult to realize such a preparation.

RELATED ART DOCUMENTS

Patent Documents

PATENT DOCUMENT 1: JP2001-106666A
PATENT DOCUMENT 2: JP2007-246496A

Non Patent Document

NON PATENT DOCUMENT 1: Kenichi Kida, "Agchem Age", No. 195, NIPPON SODA CO., LTD., December, 2013, pp. 12-17

SUMMARY OF THE INVENTION

Problems to be Solved by the Invention

The present inventors have found that a compound such as polyoxyalkylene siloxane, polyoxyethylene/polyoxypropylene block copolymer, polyoxyalkylene alkyl ether or the like enhances controlling effect of pyribencarb against wheat powdery mildew or the like when used in combination with the pyribencarb, although it exhibits no bactericidal effect when used alone. However, when such a compound as an adjuvant is blended in an agrochemical composition containing pyribencarb to prepare an aqueous suspension, the resulting aqueous suspension becomes highly viscous or solidified and moreover these changes tend to increase with time, which makes it difficult to put such an aqueous suspension into practical use.

Therefore, an object of the present invention is to provide an aqueous suspension agrochemical composition containing pyribencarb as an active component as well as an adjuvant which reinforces the chemical activity of the pyribencarb. The composition can exhibit sufficient controlling effect with a small amount of the pyribencarb while preventing its preparation from becoming highly viscous or solidified.

Means for Solving the Problems

As a result of an intensive study, the present inventors have found that an aqueous suspension agrochemical composition prepared by blending a composition containing pyribencarb and an adjuvant for the pyribencarb described above with a certain nonionic-anionic surfactant can solve the above problem, thereby completing the present invention.

The present invention will be described below.

(1) An aqueous suspension agrochemical composition including: pyribencarb which is an agrochemically active component; an adjuvant for the pyribencarb, which is one or more compounds selected from polyoxyalkylene siloxanes, polyoxyethylene/polyoxypropylene block copolymers, and polyoxyalkylene alkyl ethers; a nonionic-anionic surfactant which is a polyoxyalkylene aryl ether sulfuric acid salt and/or a polyoxyalkylene aryl ether phosphoric acid salt; and water.

(2) The aqueous suspension agrochemical composition according to (1), wherein the polyoxyalkylene siloxane is polyoxyethylenepolymethyl polysiloxane.

(3) The aqueous suspension agrochemical composition according to (1), wherein the polyoxyalkylene siloxane is polyoxyalkylenepentamethyl disiloxane, polyoxyalkyleneheptamethyl trisiloxane, or polyoxyalkylenenonamethyl tetrasiloxane.

(4) The aqueous suspension agrochemical composition according to (1), wherein the polyoxyalkylene moiety of the polyoxyalkylene alkyl ether is a polyoxyethylene or a polyoxyethylene/polyoxypropylene copolymer.

(5) The aqueous suspension agrochemical composition according to any one of (1) to (4), wherein the nonionic-anionic surfactant is a sodium salt, a potassium salt, a calcium salt, a magnesium salt, an ammonium salt, or a substituted primary to quaternary ammonium salt.

(6) The aqueous suspension agrochemical composition according to any one of (1) to (5), containing 10 to 40% by mass of the pyribencarb, 2 to 10%/o by mass of the adjuvant, and 2 to 10% by mass of the nonionic-anionic surfactant, based on the total amount of the aqueous suspension agrochemical composition.

(7) The aqueous suspension agrochemical composition according to any one of (1) to (6), wherein the viscosity at 20° C. is 100 to 1,000 mPa·s as measured with a B-type viscometer at rotation speed of 30 rpm.

(8) The aqueous suspension agrochemical composition according to (7), wherein the viscosity is 200 to 700 mPa·s.

(9) A method for spraying the aqueous suspension agrochemical composition, wherein the aqueous suspension agrochemical composition according to any one of (1) to (8) is sprayed onto a field on which agricultural/horticultural plants grow.

Effects of the Invention

Provided is a pyribencarb aqueous suspension agrochemical composition which contains an adjuvant for reinforcing the chemical activity of the pyribencarb, the adjuvant being capable of preventing the preparation from becoming highly viscous or solidified and providing a sufficient controlling effect with a small amount of the pyribencarb.

MODE FOR CARRYING OUT THE INVENTION

In the following description, the term "adjuvant" is used in a narrower sense than its original meaning unless otherwise stated and includes compounds (excluding agrochemically active components) that reinforce the efficacy of pyribencarb. In the present specification, the concentration of a substance refers to mass concentration unless otherwise specified.

The inventors of the present invention have found that compounds such as polyoxyalkylene siloxanes, polyoxyethylene/polyoxypropylene block copolymers, and polyoxyalkylene alkyl ethers can be used as adjuvants of pyribencarb as described above, and have found that an agrochemical composition including the pyribencarb which is an agrochemically active component; an adjuvant which is one or more compounds selected from polyoxyalkylene siloxanes, polyoxyethylene/polyoxypropylene block copolymers and polyoxyalkylene alkyl ethers can reinforce the efficacy of the pyribencarb. Hereinafter, the aqueous suspension agrochemical composition of the present invention will be described in detail.

The aqueous suspension agrochemical composition of the present invention is an aqueous suspension agrochemical composition including pyribencarb which is an agrochemically active component; an adjuvant; a nonionic-anionic surfactant; and water.

In the present invention, the pyribencarb is blended as an agrochemically active component. The blending ratio of the pyribencarb is not particularly limited but is usually in the range of 10 to 40% by mass, preferably 15 to 30% by mass, based on the total amount of the aqueous suspension agrochemical composition.

An adjuvant capable of reinforcing the efficacy of the pyribencarb is blended into the aqueous suspension agrochemical composition of the present invention. Examples of the compound corresponding to such an adjuvant include polyoxyalkylene fatty acid esters, polyoxyalkylene resin acid esters, polyoxyalkylene alkylaryl ethers, polyoxyalkylene alkyl ethers, polyoxyethylene/polyoxyalkylene block copolymers, polynaphthyl methanesulfonic acid tetraalkylammonium salts, petroleum hydrocarbons such as paraffinic, olefinic, naphthenic and aromatic hydrocarbons, polyoxyalkylene siloxane, dialkyl sulfosuccinic acid salt, polyoxyalkylene alkyl ether sulfuric acid salt and a part of cationic surfactant such as alkylamine, tetraalkyl ammonium salt, etc. Among them, one or more compounds selected from polyoxyalkylene siloxanes, polyoxyethylene/polyoxypropylene block copolymers and polyoxyalkylene alkyl ethers are preferable for the aqueous suspension agrochemical composition of the present invention.

The polyoxyalkylene siloxane is represented by the following general formula (1):

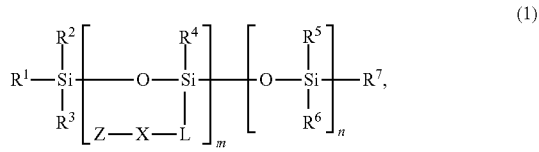

(1)

where $R^1$, $R^2$, $R^3$, $R^4$, $R^5$, $R^6$ and $R^7$ each independently represent a hydrogen atom, a hydroxyl group or an alkyl group, L represents an alkylene group having a single bond or 1 to 4 carbon atoms, X represents a polyoxyalkylene residue having an average of i oxyethylene groups and an average of j oxypropylene groups, and Z represents a hydrogen atom, a hydroxyl group, an alkyl chain having 1 to 5 carbon atoms, or an alkylcarbonyl chain having 1 to 5 carbon atoms, i is an integer of 1 to 15, j is an integer of 0 to 15, m is an integer of 1 to 3, and n is an integer of 0 to 2.

The $R^1$, $R^2$, $R^3$, $R^4$, $R^5$, $R^6$ and $R^7$ each represent preferably an alkyl group, more preferably an alkyl group having 1 to 4 carbon atoms, particularly preferably a methyl group.

The L is preferably an alkylene group having 3 to 4 carbon atoms, more preferably a propylene group.

The i in the X is preferably 3 to 9, more preferably 4 to 8. Moreover, the j is preferably 0 to 4, more preferably 0 to 2, particularly preferably 0. Furthermore, i>j is desirable.

The Z is preferably a hydroxyl group or an alkyl group having 1 to 4 carbon atoms, and more preferably a methyl group.

The sum of m and n is preferably 1 to 5, more preferably 1 to 3, particularly preferably 2.

Specific examples of the aforementioned polyoxyalkylene siloxane include polyoxyethylenepolymethyl polysiloxane, polyoxyalkylenepentamethyl disiloxane, polyoxyalkyleneheptamethyl trisiloxane and polyoxyalkylenenonamethyl tetrasiloxane, more particularly, polyoxyethylenepentamethyl disiloxane, polyoxyethyleneheptamethyl trisiloxane, polyoxyethylenenonamethyl tetrasiloxane, polyoxyethyleneallylether copolymer heptamethyl trisiloxane and the like. Some of these polyoxyalkylene siloxanes are commercially available as silicone-based surfactants. For example, polyoxyethyleneheptamethyl trisiloxane is sold as Silwet® L-77, polyoxyethyleneallylether copolymer heptamethyl trisiloxane is sold as Silwet® 408 (all manufactured by GE Silicones).

The polyoxyethylene/polyoxypropylene block copolymer is a polyoxyalkylene block copolymer composed of an average of p oxyethylene groups and an average of q oxypropylene groups. The block copolymer is characterized in that there are a polyoxyethylene residue portion in which only oxyethylene groups are continuously arranged and a polyoxypropylene residue portion in which only oxypropylene groups are consecutively arranged, in its molecule. As a polyoxyethylene/polyoxypropylene block copolymer used for the aqueous suspension agrochemical composition of the present invention, a compound is not particularly limited by p and q, but the compound having the HLB value of the polyoxyethylene/polyoxypropylene block copolymer of about 3 to 12 is preferred, and the compound having the HLB value of about 4 to 8 is particularly preferred. The HLB value is defined by the following equation:

$$HLB = \frac{20 \times 44p}{44p + 58q + 2}$$

Some of these polyoxyethylene/polyoxypropylene block copolymers are commercially available as nonionic surfactants such as Pluronic® series (manufactured by BASF).

The polyoxyalkylene alkyl ether is a compound in which an aliphatic alcohol residue and a polyoxyalkylene residue are bonded. In the polyoxyalkylene alkyl ether used for the aqueous suspension agrochemical composition of the present invention, the polyoxyalkylene moiety is preferably polyoxyethylene or a polyoxyethylene/polyoxypropylene copolymer.

When the polyoxyalkylene moiety is a polyoxyethylene/polyoxypropylene copolymer, that is, a polyoxyethylene/polyoxypropylene alkyl ether wherein an aliphatic alcohol residue having an average of r carbon atoms; and a polyoxyalkylene residue including an average of s oxyethylene groups and an average of t oxypropylene groups are bonded, the values of r, s and t are not limited. The preferable value of r is 3 to 18, more preferably 6 to 14; the value of s is preferably 3 to 15, more preferably 3 to 9; and the value of t is preferably 0 to 8, more preferably 0 to 5. Furthermore, s>t is desirable.

As these polyoxyalkylene alkyl ethers, commercially available products can be used. Such commercially available products includes: EMULGEN 1108, EMULGEN 1118S-70, EMULGEN 1135S-70, EMULGEN 1150S-60, EMULGEN LS-106, EMULGEN LS-110, EMULGEN LS-114, EMULGEN MS-110 and the like (all manufactured by Kao Corporation), Newcol® 1000-FCP, Antox® EHD-400, Antox® EHD-PNA and the like (all manufactured by Nippon Nyukazai CO., LTD.), NAROACTY CL-200, NAROACTY CL-400 and the like (all manufactured by Sanyo Chemical Industries, Ltd.), BLAUNON EL-1507, BLAUNON EL-1508P, BLAUNON EL-1509P, BLAUNON EL-1509. 5, WONDERSURF RL-80, WONDERSURF RL-100, WONDERSURF RL-140, FINESURF L-600, FINESURF L-650, ALFREE LI-800, ALFREE LI-1000, ALFREE LI-1200, ALFREE LI-1400, SAFETYCUT LI-3062, SAFETYCUT LI-3085 and the like (all manufactured by AOKI OIL INDUSTRIAL Co., Ltd.), PEGNOL C-18, PEGNOL L-4, PEGNOL L-9A, PEGNOL O-16A, PEGNOL O-20, PEGNOL O-6A, PEGNOL S-4D, PEG- NOL ST-12, PEGNOL ST-7, PEGNOL ST-9, PEGNOL T-6, PEGNOL TE-1 OA, PEGNOL TH-50, PEGNOL TH-8, MUSHUR A-2404, MUSHUR C-060, MUSHUR C-400, PEPPOR A-0638, PEPPOR AS-053X, PEPPOR AS-054C, PEPPOR B-181, PEPPOR B-182, PEPPOR B-184, PEPPOR B-188, PEPPOR BEP-0115, MUSHUR T-401 and the like (all manufactured by TOHO Chemical Industry Co., Ltd.), NOIGEN® XL, NOIGEN® TDS, NOIGEN® LF, NOIGEN TDX, NOIGEN® SD, NOIGEN® LP, DKSNL-Dash, NOIGEN® CL. ANTIFROTH® and the like (all manufactured by DKS Co., Ltd.), SURFACTANT WK (manufactured by MARUWA BIOCHEMICAL Co., Ltd.).

The adjuvant of the present invention may be used alone or in combination of two or more. The blending ratio of the adjuvant used in the present invention is not particularly limited, but it is usually 2 to 10% by mass, preferably 4 to 8% by mass, based on the total amount of an aqueous suspension agrochemical composition. When the blended amount is less than 2% by mass, there is a concern that the desired efficacy reinforcement effect may be insufficient depending on circumstances.

A nonionic-anionic surfactant is further blended into the aqueous suspension agrochemical composition of the present invention. A nonionic-anionic surfactant is a compound having in its molecule a hydrophobic group such as an alkyl group, an aryl group or the like; an anionic dissociable group such as a sulfate ester residue, a sulfo group, a phosphate ester residue, a carboxyl group or the like; and a polyoxyalkylene residue including oxyalkylene groups such as usually a plurality of oxyethylene groups or the like. The counter cation species forming a salt with the anionic dissociable group are not particularly limited, but preferably a nonionic-anionic surfactant used in the present invention is, for example, a sodium salt, a potassium salt, a calcium salt, a magnesium salt, an ammonium salt or a substituted primary to quaternary ammonium salt.

Examples of such nonionic-anionic surfactant include polyoxyalkylene alkyl ether sulfuric acid ester salts, polyoxyalkylene alkyl aryl ether sulfuric acid ester salts, polyoxyalkylene alkyl aryl ether phosphoric acid ester salts, polyoxyalkylene alkyl sulfonic acid salts, polyoxyalkylene higher fatty acid salts and the like. Among them, polyoxyalkylene aryl ether sulfuric acid salt and/or polyoxyalkylene aryl ether phosphoric acid salt is preferred. Specific examples of the compound include polyoxyethylenetristyrylphenylether phosphoric acid ester potassium salt, polyoxyethylenetristyrylphenylether sulfuric acid ester ammonium salt and the like. The nonionic-anionic surfactant of the present invention may be used alone or in combination of two or more.

The blending ratio of the nonionic-anionic surfactant is not limited, but it is usually 2 to 10% by mass, preferably 4 to 8% by mass, based on the total amount of the aqueous suspension agrochemical composition.

The aforementioned pyribencarb, adjuvant, nonionic-anionic surfactant and water as a dispersion medium or solvent for the following optional components are blended in the aqueous suspension agrochemical composition of the present invention. The water referred herein may of course be pure water or distilled water or may contain trace amounts of agriculturally or industrially acceptable impurities. It is also possible to use drinking water such as mineral water or tap water, or agricultural or industrial water obtained by duly treating groundwater or river water. Water also serves as an extender for an aqueous suspension agrochemical composition and its blending ratio is not particularly limited, but when water is insufficient relative to the amount of pyribencarb, the pyribencarb/water dispersion system in the aqueous suspension agrochemical composition becomes unstable. Accordingly, it is preferable to blend water in an amount equal to or more than that of pyribencarb.

In addition, auxiliary agents may be blended into the aqueous suspension agrochemical composition of the present invention as desired. Examples of such auxiliary agent which is an optional component include a thickener, an antifreezing agent, an antifoaming agent, a pH adjusting agent, a preservative and the like, and, if desired, known coloring matters such as Pigment Orange 16 or Blue No. 1 Dyes may be added.

Specific examples of thickeners include natural polysaccharides such as gum arabic, xanthan gum, guar gum, tamarind gum, and pectin; and mineral fine powders such as white carbon, talc, bentonite, and clay. The aforementioned thickeners may be used alone or in combination of two or more.

Specific examples of the antifreezing agent include water-soluble substances having relatively low molecular weight typified by urea and common salt; water-soluble polyhydric alcohols and the like typified by propylene glycol, ethylene glycol, diethylene glycol and glycerin, and a substance known for this usage may be optionally used alone or in combination of two or more.

Specific examples of the antifoaming agent include silicone-based antifoaming agent typified by dimethyl polysiloxane and polyphenyl siloxane; and fatty acids or metal salts thereof typified by myristic acid and sodium stearate, and a substance known for this usage may be optionally used alone or in combination of two or more.

Examples of the pH adjusting agent include acidic substances typified by sulfuric acid and potassium dihydrogen phosphate; basic substances typified by sodium hydroxide and calcium carbonate; a mixture of a weak acid and a conjugated base thereof or a mixture of a weak base and a conjugated acid thereof exhibiting buffering ability in an aqueous solution, and a substance known for this usage may be optionally used alone or in combination of two or more.

Examples of the preservative include parabens, sorbic acid salt, 5-chloro-2-methyl-4-isothiazolin-3-one, 2-bromo-2-propan-1,3-diol, 1,2-benzisothiazolin-3-one and the like, and a substance known for this usage may be optionally used alone or in combination of two or more.

The surfactant is blended as an essential component in the aqueous suspension agrochemical composition of the present invention and the surfactant also serves as a wetting/spreading agent, a dispersing agent and the like. Therefore, it is not necessary for the compound to further contain other surfactants. However, the compound may further contain other surfactants depending on the purpose. Examples of other surfactants which may be optionally blended will be listed below, however, the present invention is not construed to be limited to them and such surfactant may be used alone or in combination of two or more.

[Nonionic Surfactant]

Polyalkylene glycol higher fatty acid ester, polyoxyalkylene aryl phenyl ether, sorbitan monoalkylate, acetylene alcohol, and acetylene diol, and an alkylene oxide adduct thereof are included.

[Cationic Surfactant]

Tetraalkyl ammonium salt, alkyl amine and alkyl pyridinium salt are included.

[Anionic Surfactant]

Alkyl aryl sulfonic acid salt, dialkyl sulfonic acid salt, dialkyl succinic acid salt, lignin sulfonic acid salt, aryl sulfonic acid salt and condensate thereof, alkyl sulfuric acid ester salt, alkyl phosphoric acid ester salt, alkyl aryl sulfuric acid ester salt, alkylarylphosphoric acid ester salt and polycarboxylic acid salt are included.

[Ampholytic Surfactant]

Alkyl betaine, alkyl amine oxide, alkyl imidazolinium betaine, amino acid and lecithin are included.

[Others]

Silicone surfactants other than the aforementioned polyoxyalkylene siloxane-based surfactants, fluorine-based surfactants and the like are included.

In general, in an aqueous suspension agrochemical composition, extremely low viscosity results in remarkable liquid phase separation during storage, whereas extremely high viscosity makes it difficult to discharge from a bottle at the time of use. In the present invention, the viscosity range of the aqueous suspension agrochemical composition, in which liquid phase separation during storage is reduced and easy discharging from the bottle is allowed during usage, is about 100 to 1,000 mPa·s, preferably about 200 to 700 mPa·s, and particularly preferably about 300 to 600 mPa·s, as measured with a B type viscometer at a rotation speed of 30 rpm at 20° C.

If desired, an additional agrochemically active component may be added in addition to the aforementioned pyribencarb to prepare an aqueous suspension agrochemical composition of the present invention as a mixed preparation. The additional agrochemically active components may be used alone or in combination of two or more. Specific examples of agrochemically active components that can be additionally added will be listed below but are not limited thereto.

[Antibacterial Active Component]

Azaconazole, acibenzolar-S-methyl, azoxystrobin, anilazine, amisulbrom, ametoctradin, aldimorph, isotianil, isopyrazam, isofetamid, isoprothiolane, ipconazole, iprodione, iprovalicarb, iprobenfos, imazalil, iminoctadine-trialbesilate, iminoctadine-triacetate, imibenconazole, edifenphos, etaconazole, ethaboxam, ethirimol, ethoxyquin, etridiazole, enestroburin, enoxastrobin, epoxiconazole, organic oils, oxadixyl, oxazinylazole, oxathiapiprolin, oxycarboxin, oxyquinoline copper (oxine-copper), oxytetracycline, oxpoconazole-fumarate, oxolinic acid, copper octanoate (copper dioctanoate), octhilinone, ofurace, orysastrobin, o-phenylphenol, kasugamycin, captafol, carpropamid, carbendazim, carboxin, carvone, quinoxyfen, chinomethionat, captan, quinconazole, quintozene, guazatine, cufraneb, coumoxystrobin, kresoxim-methyl, clozylacon, chlozolinate, cblorothalonil, chloroneb, cyazofamid, diethofencarb, diclocymet, dichlofluanid, diclomezine, dicloran, dichlorophen, dithianon, diniconazole, diniconazole-M, zineb, dinocap, dipymetitrone, diphenylamine, difenoconazole, cyflufenamid, diflumetorim, cyproconazole, cyprodinil, simeconazole, dimethirimol, dimethyl disulfide, dimethomorph, cymoxanil, dimoxystrobin, ziram, silthiofam, streptomycin, spiroxamine, sedaxane, zoxamide, dazomet, tiadinil, thiabendazole, thiram, thiophanate, thiophanate-methyl, thiflu-zamide, tecnazene, tecloftalam, tetraconazole, debacarb, tebuconazole, tebufloquin, terbinafine, dodine, dodemorph, triadimenol, triadimefon, triazoxide, trichlamide, triclopyricarb, tricyclazole, triticonazole, tridemorph, triflumizole, trifloxystrobin, triforine, tolylfluanid, tolclofos-methyl, tolnifanide, tolprocarb, nabam, natamycin, naftifine, nitrapyrin, nitrothal-isopropyl, nuarimol, copper nonyl phenol sulphonate, *Bacillus subtilis* (strain: QST 713), validamycin, valifenalate, picarbutrazox, bixafen, picoxystrobin, bitertanol, binapacryl, biphenyl, piperalin, hymexazol, pyraoxystrobin, pyraclostrobin, pyrazifluimid, pyrazophos, pyrametostrobin, pyriofenone, pyrisoxazole, pyrifenox, pyributicarb, pyrimethanil, pyroquilon, vinclozolin, ferbam, famoxadone, phenazine oxide, fenamidone, fenaminstrobin, fenarimol, fenoxanil, ferimzone, fenpiclonil, fenpyrazamine, fenbuconazole, fenfuram, fenpropidin, fenpropimorph, fenhexamid, folpet, phthalide, bupirimate, fuberidazole, blasticidin-S, furametpyr, furalaxyl, furancarboxylic acid, fluazinam, fluoxastrobin, fluopicolide, fluopyram, fluoroimide, fluxapyroxad, fluquinconazole, furconazole, furconazole-cis, fludioxonil, flusilazole, flusulfamide, flutianil, flutolanil, flutriafol, flufenoxystrobin, flumetover, flumorph, proquinazid, prochloraz, procymidone, prothiocarb, prothioconazole, bronopol, propamocarb-hydrochloride, propiconazole, propineb, probenazole, bromuconazole, hexaconazole, benalaxyl, benalaxyl-M, benodanil, benomyl, pefurazoate, penconazole, pencycuron, benzovindiflupyr, benthiazole, benthiavalicarb-isopropyl, penthiopyrad, penflufen, boscalid, fosetyl (alminium, calcium, sodium), polyoxin, polycarbamate, Bordeaux mixture, mancozeb, mandipropamid, mandestrobin, maneb, myclobutanil, mineral oils, mildiomycin, methasulfocarb, metam, metalaxyl, metalaxyl-M, metiram, metconazole, metominostrobin, metrafenone, mepanipyrim, meptyldinocap, mepronil, iodocarb, laminarin, phosphorous acid and salts, copper oxychloride, silver, cuprous oxide, copper hydroxide, potassium bicarbonate, sodium bicarbonate, sulfur, oxyquinoline sulfate, copper sulfate, (3,4-dichloroisothiazol-S-yl)methyl 4-(tert-butyl)benzoate (Chemical Name, CAS Registered Number: 1231214-23-5), 3-((3,4-dichloroisothiazol-5-yl)methoxy)benzo[d]isothiazol-1,1-dioxide (Chemical Name, CAS Registered Number:957144-77-3), BAF-045 (Code Number), BAG-010 (Code Number), DBEDC (dodecylbenzenesulfonic acid bisethylenediamine copper complex salt [II]), MIF-1002 (Code Number), TPTA (fentin acetate), TPTC (triphenyltin chloride), TPTH (triphenyltin hydroxide) and nonpathogenic *Erwinia carotovora* are included.

[Insecticidal Component]

Acrinathrin, azadirachtin, azamethiphos, azinphos-ethyl, azinphos-methyl, acequinocyl, acetamiprid, acetoprole, acephate, azocyclotin, abamectin, afidopyropen, amidoflumet, amitraz, alanycarb, aldicarb, aldoxycarb, allethrin [including d-cis-trans-isomer, d-trans-isomer], isazophos, isamidofos, isocarbophos, isoxathion, isofenphos-methyl, isoprocarb, ivermectin, imicyafos, imidacloprid, imiprothrin, indoxacarb, esfenvalerate, ethiofencarb, ethion, ethiprole, ethylene dibromide, etoxazole, etofenprox, ethoprophos, etrimfos, emamectinbenzoate, endosulfan, empenthrin, oxamyl, oxydemeton-methyl, oxydeprofos, omethoate, cadusafos, kappa-tefluthrin, kappa-bifenthrin, karanjin, cartap, carbaryl, carbosulfan, carbofuran, gamma-BHC, xylylcarb, quinalphos, kinoprene, chinomethionat, coumaphos, cryolite, clothianidin, clofentezine, chromafenozide, chlorantraniliprole, chloretboxyfos, chlordane, chloropicrin, chlorpyrifos, chlorpyrifos-methyl, chlorfenapyr, chlorfenvinphos, chlorfluazuron, chlormephos, cyanophos, diafenthiuron, diamidafos, cyantraniliprole, dienochlor, cyenopyrafen, dioxabenzofos, diofenolan, cyclaniliprole, dicrotophos, dichlofenthion, cycloprothrin, dichlorvos, dicloromezotiaz, 1,3-dichloropropene, dicofol, dicyclanil, disulfoton, dinotefuran, dinobuton, cyhalothrin [including gamma-isomer, lambda-isomer], cyphenothrin [including (1R)-trans-isomer], cyfluthrin [including beta-isomer], diflubenzuron, cyflumetofen, diflovidazin, cyhexatin, cypermethrin [including alpha-isomer, beta-isomer, theta-isomer, zeta-isomer], dimethylvinphos, dimefluthrin, dimethoate, silafluofen, cyromazine, spinetoram, spinosad, spirodiclofen, spirotetramat, spiromesifen, sulcofuron-sodium, sulfluramid, sulfoxaflor, sulfotep, diazinon, thiacloprid, thiamethoxam, tioxazafen, thiodicarb, thiocyclam, thiosultap, thionazin, thiofanox, thiometon, tetrachlorvinphos, tetradifon, tetraniliprole, tetramethyifluthrin, tetramethrin, tebupirimfos, tebufenozide, tebufenpyrad, tefluthrin, teflubenzuron, demeton-S-methyl, temephos, deltamethrin, terbufos, tralomethrin, transfluthrin, triazamate, triazophos, trichlorfon, triflumuron, triflumezopyrim, trimethacarb, tolfenpyrad, naled, nitenpyram, novaluron, noviflumuron, *Verticillium* lecanii, hydroprene, Pasteuriapenetrans spore (Pasteuriapenetrans), vamidothion, parathion, parathion-methyl, halfenprox, halofenozide, bioallethrin, bioallethrin S-cyclopentenyl, bioresmethrin, bistrifluron, hydramethylnon, bifenazate, bifenthrin, pyflubumide, piperonyl butoxide, pymetrozine, pyraclofos, pyrafluprole, pyridaphenthion, pyridaben, pyridalyl, pyrifluquinazon, pyriprole, pyriproxyfen, pirimicarb, pyrimidifen, pyriminostrobin, pirimiphos-methyl, pyrethrine, famphur, fipronil, fenazaquin, fenamiphos, fenitrothion, fenoxycarb, fenothiocarb, phenothrin [including (1R)-trans-isomer], fenobucarb, fenthion, phenthoate, fenvalerate, fenpyroximate, fenbutatin oxide, fenpropathrin, fonofos, sulfuryl fluoride, butocarboxim, butoxycarboxim, buprofezin, furathiocarb, prallethrin, fluacrypyrim, fluazuron, fluensulfone, sodium fluoroacetate, flucycloxuron, flucythrinate, flusulfamide, fluvalinate [including tau-isomer], flupyradifurone, flupyrazofos, flufiprole, flufenerim, flufenoxystrobin, flufenoxuron, fluhexafon, flubendiamide, fluethrin, protrifenbute, prothiofos, flonicamid, propaphos, propargite, profenofos, broflanilide, profluthrin, propetamphos, propoxur, flometoquin, bromopropylate, bexytbiazox, hexaflumuron, *Paecilomyces tenuipes*, *Paecilomyces* fumosoroceus, heptafluthrin, heptenophos, permethrin, benclothiaz, bensultap, benzoximate, bendiocarb, benfuracarb, *Beauveria tenella*, *Beauveria bassiana*, *Beauveria brongniartii*, phoxim, phosalone, fosthiazate, fosthietan, phosphamidon, phosmet, polynactin complex (polynactins), formetanate, phorate, malathion, milbemectin, mecarbam, mesulfenfos, methoprene, methomyl, metaflumizone, methamidophos, metham, methiocarb, methidathion, methyl isothiocyanate, methyl bromide, methoxychlor, methoxyfenozide, methothrin, metofluthrin, methoprene, metolcarb, mevinphos, meperfluthrin, Monacrosporium phymatophagum, monocrotophos, momfluorothrin, litlure-A, litlure-B, aluminium phosphide, zinc phosphide, hydrogen phosphide (phosphine), lufenuron, rescalure, resmethrin, lepimectin, rotenone, fenbutatin oxide, calcium cyanamide (calcium cyanide), nicotine sulfate, (Z)-11-tetradecenyl=acetate, (Z)-11-hexadecenal, (Z)-11-hexadecenyl=acetate, (Z)-9,12-tetradecadienyl=acetate, (Z)-9-tetradecen-1-ol, (Z,E)-9,11-tetradecadienyl=acetate, (Z,E)-9,12-tetradecadienyl=acetate, *Bacillus popilliae*, *Bacillus subtillis*, *Bacillus sphaericus*, *Bacillus thuringiensis* subsp. *Aizawai*, *Bacillus thuringiensis* subsp. *Israelensis*, *Bacillus thuringiensis* subsp. *Kurstaki*, *Bacillus thuringiensis* subsp. *Tenebrionis*, Bt protein (Cry1Ab, Cry1Ac, Cry1Fa, Cry2Ab, mCry3A, Cry3Ab, Cry3Bb, Cry34/35Ab1), CL900167 (Code Number), DCIP (bis-(2-chloro-1-methylethyl)ether), DDT (1,1,1-trichloro-2,2-bis(4-chlorophenyl)ethane), DEP (dimethyl-2,2,2-trichloro-1-hydroxyethylphosphonate), DNOC (4,6-dinitro-o-cresol), DSP (O,O-diethyl-O-[4-(dimethylsulfamoyl)phenyl]-phosphorothioate), EPN (O-ethyl-O-4-(nitrophenyl)phenylphosphorothioate, nuclear polyhedrosis visur occlusion body, NA-85 (Code Number), NA-89 (Code Number), NC-515 (Code Number), RU15525 (Code Number), ZDI-2501 (Code Number), XMC, Z-13-icosen-10-one, ZXI8901 (Code Number) and MES382 are included.

[Herbicidal Component]

Ioxynil, aclonifen, acrolein, azafenidin, acifluorfen (including a salt with sodium or the like), azimsulfuron, asulam, acetochlor, atrazine, anilofos, amicarbazone, amidosulfuron, amitrole, aminocyclopyrachlor, aminopyralid, amiprofos-methyl, ametryn, alachlor, alloxydim, isouron, isoxachlortole, isoxaflutole, isoxaben, isoproturon, ipfencarbazone, imazaquin, imazapic (including a salt with amine or the like), imazapyr (including a salt with isopropylamine or the like), imazamethabenz-methyl, imazamox, imazethapyr, imazosulfuron, indaziflam, indanofan, eglinazine-ethyl, esprocarb, ethametsulfuron-methyl, ethalfluralin, ethidimuron, ethoxysulfuron, ethoxyfen-ethyl, ethofumesate, etobenzanid, endothal-disodium, oxadiazon, oxadiargyl, oxaziclomefone, oxyfluorfen, oryzalin, orthosulfamuron, orbencarb, cafenstrole, carfentrazone-ethyl, karbutilate, carbetamide, quizalofop-ethyl, quizalofop-P-ethyl, quizalofop-P-tefuryl, quinoclamine, quinclorac, quinmerac, cumyluron, clacyfos, glyphosate (including a salt with sodium, potassium, ammonium, amine, propylamine, isopropylamine, dimethylamine, trimesium or the like), glufosinate (including a salt with amine, sodium or the like), glufosinate-P-sodium, clethodim, clodinafop-propargyl, clopyralid, clomazone, chlomethoxyfen, clomeprop, cloransulam-methyl, chloramben, chloridazon, chlorimuron-ethyl, chlorsulfuron, chlorthal-dimethyl, chlorthiamid, chlorphthalim, chlorflurenol-methyl, chlorpropham, chlorbromuron, chloroxuron, chlorotoluron, saflufenacil cyanazine, cyanamide, diuron, diethatyl-ethyl, dicamba (including a salt with amine, diethylamine, isopropylamine, diglycolamine, sodium, lithium or the like), cycloate, cycloxydim, diclosulam, cyclosulfamuron, cyclopyrimorate, dichlobenil, diclofop-P-methyl, diclofop-methyl, dichlorprop, dichlorprop-P, diquat, dithiopyr, siduron, dinitramine, cinidon-ethyl, cinosulfuron, dinoterb, cyhalofop-butyl, diphenamid, difenzoquat, diflufenican, diflufenzopyr, simazine, dimethachlor, dimethametryn, dimethenamid, dimethenamid-P, simetryn, dimepiperate, dimefuron, cinmethylin, swep, sulcotrione, sulfentrazone, sethoxydim, terbacil, daimuron, dalapon, thiazopyr, tiafenacil, thiencarbazone (including a sodium salt, methyl ester or the like), tiocarbazil, thiobencarb, thidiazimin, thifensulfuron-methyl, desmedipham, desmetryne, thenylchlor, tebutam, tebuthiuron, tepraloxydim, tefuryltrione, tembotrione, terbuthylazine, terbutryn, terbumeton, topramezone, tralkoxydim, triaziflam, triasulfuron, triafamone, tri-allate, trietazine, triclopyr, triclopyr-butotyl, trifludimoxazin, tritosulfuron, triflusulfuron-methyl, trifluralin, trifloxysulfuron-sodiumr, tribenuron-methyl, tolpyralate, naptalam (including a salt with sodium or the like), naproanilide, napropamide, napropamide-M, neburon, norflurazon, vernolate, paraquat, halauxifen-methyl, haloxyfop, haloxyfop-P, haloxyfop-etotyl, halosulfuron-methyl, picloram, picolinafen, bicyclopyrone, bispyribac-sodium, pinoxaden, bifenox, piperophos, pyraclonil, pyrasulfotole, pyrazoxyfen, pyrazosulfuron-ethyl, pyrazolynate, bilanafos, pyraflufen-ethyl, pyridafol, pyrithiobac-sodium, pyridate, pyriftalid, pyributicarb, pyribenzoxim, pyrimisulfan, pyriminobac-methyl, pyroxasulfone, pyroxsulam, phenisopham, fenuron, fenoxasulfone, fenoxaprop-P-ethyl, fenquinotrione, fenthiaprop-ethyl, fentrazamide, phenmedipham, foramsulfuron, butachlor, butafenacil, butamifos, butylate, butenachlor, butralin, butroxydim, flazasulfuron, flamprop (including methyl ester, ethyl ester, isopropyl ester), flamprop-M (including methyl ester, ethyl ester, isopropyl ester), fluazifop-butyl, fluazifop-P-butyl, fluazolate, fluometuron, fluoroglycofen-ethyl, flucarbazone-sodium, fluchloralin, flucetosulfuron, fluthiacet-methyl, flupyrsulfuron-methyl-sodium, flufenacet, flufenpyr-ethyl, flupropanate, flupoxame, flumioxazin, flumiclorac-pentyl, flumetsulam, fluridone, flurtamone, fluroxypyr, flurochloridone, pretilachlor, procarbazone-sodium, prodiamine, prosulfocarb, propaquizafop, propachlor, propazine, propanil, propyzamide, propisochlor, propyrisulfuron, propham, profluazol, propoxycarbazone-sodium, profoxydim, bromacil, brompyrazon, prometryn, prometon, bromoxynil (including an ester such as butyrate, octanoate, or heptanoate), bromofenoxim, bromobutide, florasulam, pethoxamid, benazolin, penoxsulam, heptamaloxyloglucan, beflubutamid, pebulate, bencarbazone, pendimethalin, benzfendizone, bensulide, bensulfuron-methyl, benzobicyclon, benzofenap, bentazone, pentanochlor, pentoxazone, benfluralin, benfuresate, fosamine, fomesafen, mecoprop (including a salt such as sodium salt, potassium salt, isopropylamine salt, triethanolamine salt, dimethylamine salt, or the like), mecoprop-P-potassium, mesosulfuron-methyl, mesotrione, metazachlor, metazosulfuron, methabenzthiazuron, metamitron, metamifop, methiozolin, methyldymuron, metoxuron, metosulam, metobromuron, metobenzuron, metolachlor, metribuzin, mefenacet, monolinuron, molinate, iodosulfuron, iodosulfulon-methyl-sodium, iofensulfuron, iofensulfuron-sodium, lactofen, linuron, lenacil, 2,3,6-TBA (2,3,6-trichlorobenzoic acid), 2,4,5-T(2,4,5-trichlorophenoxyacetic acid), 2,4-D (2,4-dichlorophenoxyacetic acid) (including a salt such as amine salt, diethylamine salt, triethanolamine salt, isopropylamine salt, sodium salt, lithium salt or the like), 2,4-DB (4-(2,4-dichlorophenoxy)butyric acid), AE-F-150944 (Code Number), DNOC (4,6-dinitro-o-cresol) (including a salt such as amine salt, sodium salt or the like), EPTC (S-ethyldipropylthiocarbamate), MCPA (2-methyl-4-chlorophenoxyacetic acid), MCPA-thioethyl, MCPB (2-methyl-4-chlorophenoxybutyric acid) (including a sodium salt, an ethyl ester, or the like), SYP-298 (Code Number), SYP-300 (Code Number), S-metolachlor and TCA (2,2,2-trichloroacetic acid) (including a salt such as sodium salt, calcium salt, ammonia salt or the like) are included.

[Active Component for Plant Growth Regulation]

1-Methylcyclopropene, 1-naphthylacetamide, 2,6-diisopropylnaphthalene, 4-CPA (4-chlorophenoxyacetic acid), benzylaminopurine, ancymidol, aviglycine, carvone, chlormequat, cloprop, cloxyfonac, cloxyfonac-potassium, cyclanilide, cytokinins, daminozide, dikegulac, dimethipin, ethephon, epocholeone, ethychlozate, flumetralin, flurenol, flurprimidol, forchlorfenuron, gibberellins, inabenfide, indole acetic acid, indole butyric acid, maleic hydrazide, mefluidide, mepiquat chloride, n-decanol paclobutrazol, prohexadione-calcium, prohydrojasmon, sintofen, thidiazuron, triacontanol, trinexapac-ethyl, uniconazole, uniconazole-P, -4-(24-oxo-phenylethyl)aminobutyric acid (Chemical Name, CAS Registered Number: 1083-55-2) and calcium peroxide are included.

As the pyribencarb and additional agrochemically active components mentioned above, pure forms or industrial raw materials thereof may be directly used. Alternatively, they may be used in the form of reservoir type microcapsules containing the agrochemically active components coated with wall materials or in the form of monolithic type microcapsules in which the agrochemically active components are dispersed in the core of matrix. Application of formulation pretreatment technique of agrochemically active component is not particularly limited and known methods and materials may be optionally used as desired.

When an additional agrochemically active component is blended, in addition to the pyribencarb, to the aqueous suspension agrochemical composition of the present invention, the blending ratio of agrochemically active components including the pyribencarb is not particularly limited, but is usually 10 to 50% by mass, preferably 15 to 45% by mass, based on the total amount of the aqueous suspension agrochemical composition.

If desired, a phytotoxicity reducing agent may be compounded into the aqueous suspension agrochemical composition of the present invention. Specific examples of phytotoxicity reducing agents that can be blended will be listed below, but the present invention is not construed to be limited to these phytotoxicity reducing agents.

[Phytotoxicity Reducing Agent]

Isoxadifen, isoxadifen-ethyl, oxabetrinil, cloquintcet-mexyl, cyometrinil, dichlormid, dicyclonone, cyprosulfamide, 1,8-naphthalic anhydride, fenchlorazole-ethyl, fenclorim, furilazole, fluxofenim, flurazole, benoxacor, mefenpyr, mefenpyr-ethyl, mefenpyr-diethyl, lower alkyl-substituted benzoic acid, AD-67 (4-dichloroacetyl-1-oxa-4-azaspiro [4.5]decane), DKA-24 (N1,N2-diallyl-N2-dichloroacetylglycinamide), MG-191 (2-dichloromethyl-2-methyl-1,3-dioxane), MON4660 (Code Number), N-(2-methoxybenzoyl)-4-[(methylaminocarbonyl)amino] benzenesulfonamide (Chemical Name, CAS Registered Number 129531-12-0), PPG-1292 (2,2-dichloro-N-(1,3-dioxan-2-ylmethyl)-N-(2-propenyl)acetamide), R-29148 (3-dichloroacetyl-2,2,5-trimethyl-1,3-oxazolidine) and TI-35 (Code Number) are included.

The phytotoxicity reducing agent may be used alone or in combination of two or more. When these phytotoxicity reducing agents are blended in the aqueous suspension agrochemical composition of the present invention, the blending ratio of the phytotoxicity reducing agent is not particularly limited, but it is usually 1 to 40% by mass, preferably 2 to 30% by mass, more preferably 3 to 20% by mass, based on the total amount of the aqueous suspension agrochemical composition.

The amount of the aqueous suspension agrochemical composition of the present invention to be applied varies depending on the target disease, occurrence tendency, extent of damage, environmental conditions, etc. For example, it may be appropriately selected so that the amount of the pyribencarb should be 1 to 10,000 g/ha, preferably 10 to 1,000 g/ha. The aqueous suspension agrochemical composition of the present invention can control plant diseases caused by fungi belonging to Oomycetes. Ascomycetes, Basidiomycetes, and Deuteromycetes according to the above application embodiment. Specific plant pathogenic bacteria that can be controlled will be listed below, but not limited to them.

[Plant Pathogenic Microbe]

*Pseudoperonospora* such as *Pseudoperonospora cubensis*; *Venturia* such as *Venturia inaequalis*; *Erysiphe* such as *Erysiphe graminis*; *Pyricularia* such as *Pyricularia oryzae*; *Botrytis* such as *Botrytis cinerea*; *Thanatephorus* such as *Thanatephorus cucumeris*; *Puccinia* such as *Puccinia recondita*; *Septoria* such as *Septoria nodorum*, *Sclerotinia* such as *Sclerotinia sclerotiorum*, *Botryosphaeria* such as *Botryosphaeria berengeriana*, *Monilinia* such as *Monilinia fructicola*, *Pestalotiopsis* such as *Pestalotiopsis theae*, *Diplocarpon* such as *Diplocarpon mali*, *Glomerella* such as *Glomerella cingulata*, *Phomopsis* such as *Phomopsis* sp., *Alternaria* such as *Alternaria kikuchiana*, *Cercospora* such as *Cercospora kikuchii*, *Cladosporium* such as *Cladosporium carpophilum*, *Colletotrichum* such as *Colletotrichum lindemuthianum*, *Mycovellosiella* such as *Mycovellosiella* nattrassii, Microdochium such as Microdochium nivale, Penicillium such as Penicillium italicum, Fusarium such as Fusariumoxysporum.

The method for producing the aqueous suspension agrochemical composition of the present invention is not particularly limited, but a method wherein pyribencarb, an adjuvant, a nonionic-anionic surfactant, water and, if necessary, other optional components are mixed, subjected to wet-grinding by stirring at high speed with a grinding medium such as glass beads, ceramic beads, stainless beads or the like to obtain an aqueous suspension agrochemical composition is typically contemplated. Alternatively, for the purpose of improving the efficiency of the pulverization process, the entire amount of pyribencarb and a part of the remaining raw materials are mixed and wet-pulverized to produce slurry of pyribencarb, the remaining raw materials are added to the slurry, and mixed to obtain an aqueous suspension agrochemical composition. Alternatively, pyribencarb may be dry-pulverized using means such as impact grinding, air flow grinding or the like, and the dry ground pyribencarb may be added to a mixture comprising an adjuvant, a nonionic-anionic surfactant and water and allowed to disperse to provide an aqueous suspension agrochemical composition.

Whichever manufacturing method is employed, it is preferred to finely pulverize the pyribencarb in order to attain favorable dispersion of the pyribencarb in an aqueous suspension agrochemical composition or in a diluted composition during usage. The particle size of the pyribencarb particles attained during the pulverization step is preferably about from 0.2 to 10 µm, more preferably from about 0.5 to 6 µm as volume average particle diameter. If the pyribencarb particles in an aqueous suspension agrochemical composition exceed 10 µm, liquid phase separation during storage may become remarkable, and pyribencarb particles precipitate quickly even in the diluted solution, resulting in difficulty in obtaining a uniform spray solution. The same is true for an aqueous suspension agrochemical composition, in which aggregation tendency of pyribencarb particles is observed. Such an aqueous suspension agrochemical composition does not withstand storage. The volume average particle diameter of pyribencarb particles can be measured, for example, by a laser diffraction method and a measuring apparatus using this method as a measuring principle.

In the case of the aqueous suspension agrochemical composition of the present invention to be sprayed, the aqueous suspension agrochemical composition may be diluted with water for spraying at a predetermined dilution ratio to prepare a spray solution, if necessary. Water for spraying refers to water with which the aqueous suspension agrochemical composition is diluted. The water herein represents pure water or distilled water and may contain trace amounts of agriculturally or industrially acceptable impurities. It is also possible to use drinking water such as mineral water or tap water, and agricultural or industrial water prepared by duly treating with groundwater or river water. Further, the water for spraying may be an aqueous liquid in which a predetermined amount of spreading agent and/or another agrochemical preparation is diluted in the water mentioned above. The dilution factor represents the mass part of the spray liquid prepared by diluting 1 mass part of the aqueous suspension agrochemical composition. The dilution factor is not particularly limited, but usually about 4 to 40 times for aerial spraying and about 40 to 40,000 times for ground spraying. However, when the agrochemical-registered aqueous suspension agrochemical composition of the present invention is used for agricultural/horticultural plants etc., it is of course necessary for the dilution factor to be complied with the usage regulation prescribed for the agrochemical registration.

In actual use of agrochemical preparations, two or more agrochemical preparations may be mixed in the same spraying solution and sprayed at the same time. Such a usage is known as combined application (hereinafter also referred to as "combined application" in this specification). In the case of combined application of the aqueous suspension agrochemical composition of the present invention and other agrochemical preparations, the solution to be sprayed may be prepared by diluting the aqueous suspension agrochemical composition of the present invention with water for spray, and subsequently diluting the other agrochemical preparations to a defined amount, or by diluting the aqueous suspension agrochemical composition of the present invention with water for spray in which the other agrochemical preparations having been diluted.

The spray solution prepared in this way may be sprayed using a suitable spraying device on the field on which agricultural/horticultural plants grow. As an apparatus used for spraying, for example, for aerial spraying, an aircraft equipped with an agrochemical spraying device, that is, a fixed wing aircraft such as a small light aircraft called Cessna plane, a rotary wing machine such as a manned helicopter or an unmanned helicopter, tilt rotor machine that combines both characteristics; for ground spraying, boom sprayer, speed sprayer and the like can be mentioned, but any device known for this application may be optionally used. The amount of spray solution is not particularly limited, but usually about 4 to 40 L for the aerial spraying and about 40 to 40,000 L for the ground spraying, per 1 ha field. However, when the agrochemical-registered aqueous suspension agrochemical composition of the present invention is used for agricultural/horticultural plants etc., it is of course necessary for the amount of the spray solution to be complied with the usage regulation prescribed for the agrochemical registration.

According to the present invention, by using adjuvant which reinforces the efficacy of pyribencarb which is agrochemically active component, the single package of agrochemical preparations can provide sufficient controlling effect with a smaller amount of pyribencarb compared to that in the conventional art. Therefore, such agrochemical preparation technology is extremely useful from the viewpoints of reduction of controlling cost, labor saving of controlling operation, and reduction of environmental burden by reduced agrochemical.

EXAMPLES

The present invention will be described in detail in Examples. The present invention is not intended to be limited to these Examples. In the following Examples, parts mean parts by mass. A volume average particle size is a value measured using a laser diffraction dispersion type distribution meter "Laser Micron Sizer LMS-2000e" manufactured by SEISHIN ENTERPRISE CO., LTD. The viscosity is a value obtained by measurement of a sample at 20° C. and 30 rpm using a B-type viscometer (trade name "TVB-10-M" manufactured by Toki Sangyo CO., LTD.).

[Reference Example] Efficacy Reinforcement Effect by Addition of Adjuvant

Pyribencarb (40 parts), sodium lignin sulfonate (5 parts), polyoxyethylene alkyl aryl ether (1 part), calcium carbonate (54 parts) and water (10 parts) were mixed, kneaded, extruded, and granulated, and the resultant granules were dried in a fluidized bed dryer to obtain water-dispersible granules. Thus obtained water-dispersible granules of pyribencarb were adjusted so as to have a predetermined concentration, and the adjuvant shown in the following Table 2 was added to the diluted solution to a concentration of 100 ppm to prepare a spray solution. In addition, a spray solution containing an adjuvant at a concentration of 100 ppm without containing water-dispersible granules of pyribencarb were separately prepared. Ten wheat seeds (variety: Norin No. 61) were sowed in a plastic cup having a diameter of 5.5 cm, and after grown for 7 days in a greenhouse, 25 ml/m² (30 g of pyribencarb per 1 ha) was sprayed onto the wheat at 1.5 to 2 leaf stage. After air-drying, conidia of wheat powdery mildew (*Erysiphe graminis*) were sprayed and inoculated, and the plant was placed in a greenhouse. On day 7 after inoculation, the disease onset area of the first leaves in the pot in the spray solution-treated region and the untreated region were indexed and investigated according to the criteria in Table 1 below. Based on the obtained index, the disease onset rate (%) as well as the control value (%) were further obtained by the following formulae. The results are shown in Table 2.

TABLE 1

| | |
|---|---|
| Disease Onset Index 0 | No disease onset observed |
| Disease Onset Index 1 | Disease onset area of less than 5% of the whole |
| Disease Onset Index 2 | Disease onset area of 5% or more and less than 10% of the whole |
| Disease Onset Index 3 | Disease onset area of 10% or more and less than 25% of the whole |
| Disease Onset Index 4 | Disease onset area of 25% or more of the whole |

$$\text{Disease onset rate (\%)} = \frac{\Sigma\,(\text{Index} \times \text{Number of the relevant leaves})}{\text{Number of leaves investigated} \times 4} \times 100$$

$$\text{Control value (\%)} = \left(1 - \frac{\text{Disease onset rate in treated region}}{\text{Disease onset rate in untreated region}}\right) \times 100$$

TABLE 2

Control effect on wheat powdery mildew by addition of adjuvant

| | Amount of pyribencarb (g/ha) | |
|---|---|---|
| Adjuvant (100 ppm) | 0 | 30 |
| Polyoxyalkylene alkyl ether (Trade name "SURFACTANT WK" (manufactured by MARUWA BIOCHEMICAL Co., Ltd.)) | 0 | 54.3 |
| Polyoxyethylene aryl copolymer heptamethyl trisiloxane (Trade name "Silwet ® 408" (manufactured by GE Silicones) (Polyoxyalkylene siloxane) | 0 | 68.6 |
| Polyoxyethyleneheptamethyltrisiloxane (Trade name "Silwet ® L-77" (manufactured by GE Silicones) (Polyoxyalkylene siloxane) | 0 | 87.1 |
| Polyoxyethylene/polyoxypropylene block copolymer (HLB = 11.4) | 0 | 68.8 |
| Polyoxyalkylene alkyl aryl ether | 0 | 43.5 |
| No adjuvant added (0 ppm) | | 33.2 |

Example 1

Pyribencarb (20 parts), polyoxyethylene/polyoxypropylene block copolymer (HLB=5, 2 parts), polyoxyethylene tristyrylphenylether phosphoric acid ester potassium salt (4 parts), propylene glycol (10 parts), xanthan gum (0.25 parts), and water (63.75 parts) were mixed, wet pulverized to an average particle size of 4 μm as a volume average particle size, to obtain an aqueous suspension agrochemical composition of the present invention containing 20% by mass of pyribencarb. The viscosity of thus obtained aqueous suspension agrochemical composition was 438 mPa·s. Further, such an aqueous suspension agrochemical composition dispersed rapidly when poured into water, allowing to prepare a homogeneous dilution.

Example 2

Pyribencarb (20 parts), polyoxyethylene heptamethyl trisiloxane (Trade name "Silwet® L-77" (manufactured by GE Silicones, 2 parts), polyoxyethylene tristyrylphenylether phosphoric acid ester potassium salt (4 parts), propylene glycol (10 parts), xanthan gum (0.25 parts), and water (63.75 parts) were mixed, wet pulverized to an average particle size of 4 μm as a volume average particle size, to obtain an aqueous suspension agrochemical composition of the present invention containing 20% by mass of pyribencarb. The viscosity of thus obtained aqueous suspension agrochemical composition was 577 mPa·s. Further, such an aqueous suspension agrochemical composition dispersed rapidly when poured into water, allowing to prepare a homogeneous dilution.

Example 3

Pyribencarb (20 parts), polyoxyethylene/polyoxypropylene alkylether (average carbon atoms of aliphatic alcohol residue=9, average oxyethylene groups=9, average oxypropylene groups=4.5, 2 parts), polyoxyethylene tristyrylphenylether sulfuric acid ester ammonium salt (4 parts), propylene glycol (10 parts), xanthan gum (0.25 parts), and water (63.75 parts) were mixed, wet pulverized to an average particle size of 4 μm as a volume average particle size, to obtain an aqueous suspension agrochemical composition of the present invention containing 20% by mass of pyribencarb. The viscosity of thus obtained aqueous suspension agrochemical composition was 532 mPa·s. Further, such an aqueous suspension agrochemical composition dispersed rapidly when poured into water, allowing to prepare a homogeneous dilution.

Example 4

Pyribencarb (20 parts), polyoxyethylene/polyoxypropylene block copolymer (HLB=5, 5 parts), polyoxyethylene tristyrylphenylether sulfuric acid ester ammonium salt (10 parts), propylene glycol (10 parts), xanthan gum (0.25 parts), and water (54.75 parts) were mixed, wet pulverized to an average particle size of 4 μm as a volume average particle size, to obtain an aqueous suspension agrochemical composition of the present invention containing 20% by mass of pyribencarb. The viscosity of thus obtained aqueous suspension agrochemical composition was 649 mPa·s. Further, such an aqueous suspension agrochemical composition dispersed rapidly when poured into water, allowing to prepare a homogeneous dilution.

Example 5

Pyribencarb (20 parts), polyoxyethylene/polyoxypropylene alkylether (average carbon atoms of aliphatic alcohol residue-=9, average oxyethylene groups=9, average oxypropylene groups=4.5, 5 parts), polyoxyethylene tristyrylphenylether phosphoric acid ester potassium salt (10 parts), urea (10 parts), xanthan gum (0.25 parts), and water (54.75 parts) were mixed, wet pulverized to an average particle size of 4 μm as a volume average particle size, to obtain an aqueous suspension agrochemical composition of the present invention containing 20% by mass of pyribencarb. The viscosity of thus obtained aqueous suspension agrochemical composition was 490 mPa·s. Further, such an aqueous suspension agrochemical composition dispersed rapidly when poured into water, allowing to prepare a homogeneous dilution.

Comparative Example 1

Pyribencarb (20 parts), polyoxyethylene tristyrylphenylether phosphoric acid ester potassium salt (4 parts), propylene glycol (10 parts), xanthan gum (0.25 parts), and water (65.75 parts) were mixed, wet pulverized to an average particle size of 4 μm as a volume average particle size, to obtain an aqueous suspension agrochemical composition containing 20% by mass of pyribencarb. The viscosity of thus obtained aqueous suspension agrochemical composition was 444 mPa·s. Further, such an aqueous suspension agrochemical composition dispersed rapidly when poured into water, allowing to prepare a homogeneous dilution.

Comparative Example 2

Pyribencarb (20 parts), polyoxyethylene/polyoxypropylene block copolymer (HLB=5, 2 parts), propylene glycol (10 parts), xanthan gum (0.25 pans), and water (67.75 parts) were mixed, wet pulverized to an average particle size of 4 μm as a volume average particle size, to obtain an aqueous suspension agrochemical composition containing 20% by mass of pyribencarb. Thus obtained aqueous suspension agrochemical composition had a viscosity higher than 1,000 mPa·s and exhibited gel-like state with almost no fluidity. The composition was completely solidified on the day after production, and impossible to be used as a liquid agrochemical preparation.

Comparative Example 3

Pyribencarb (20 parts), polyoxyethylene/polyoxypropylene block copolymer (HLB=5, 2 parts), alkylsulfuric acid sodium salt (2 parts), lignin sulfonic acid sodium salt (3 parts), propylene glycol (10 parts), xanthan gum (0.25 parts), and water (62.75 parts) were mixed, wet pulverized to an average particle size of 4 μm as a volume average particle size, to obtain an aqueous suspension agrochemical composition containing 20% by mass of pyribencarb. Thus obtained aqueous suspension agrochemical composition had a viscosity higher than 1,000 mPa·s and extremely poor fluidity. In addition, such an aqueous suspension agrochemical composition maintained a viscous bulk state even when it was put into water and did not disperse. It was impossible to easily prepare a homogeneous diluted solution. Therefore, it was not practical as a liquid agrochemical preparation.

Comparative Example 4

Pyribencarb (20 parts), polyoxyethylene/polyoxypropylene block copolymer (HLB=5, 2 parts), alkylarylsulfonic acid sodium salt (2 parts), arylsulfonic acid sodium salt formalin condensate (3 parts), propylene glycol (10 parts), xanthan gum (0.25 parts), and water (62.75 parts) were mixed, wet pulverized to an average particle size of 4 μm as a volume average particle size, to obtain an aqueous suspension agrochemical composition containing 20% by mass of pyribencarb. Thus obtained aqueous suspension agrochemical composition had a viscosity higher than 1,000 mPa·s and extremely poor fluidity. In addition, such an aqueous suspension agrochemical composition maintained a viscous bulk state even when it was put into water and did not disperse. It was impossible to easily prepare a homogeneous diluted solution. Therefore, it was not practical as a liquid agrochemical preparation.

Comparative Example 5

Pyribencarb (20 parts), polyoxyethylene/polyoxypropylene block copolymer (HLB 5, 2 parts), dialkylsulfosuccinic acid sodium salt (2 parts), polycarboxylic acid sodium salt (3 parts), propylene glycol (10 parts), xanthan gum (0.25 parts), and water (62.75 parts) were mixed, wet pulverized to an average particle size of 4 μm as a volume average particle size, to obtain an aqueous suspension agrochemical composition containing 20% by mass of pyribencarb. Thus obtained aqueous suspension agrochemical composition had a viscosity higher than 1,000 mPa·s and exhibited gel-like state with almost no fluidity. The composition was completely solidified on the day after production, and impossible to be used as a liquid agrochemical preparation.

Comparative Example 6

Pyribencarb (20 parts), polyoxyethylene heptamethyl trisiloxane (Trade name "Silwet L-77" (manufactured by GE Silicones, 2 parts), propylene glycol (10 parts), xanthan gum (0.25 parts), and water (67.75 parts) were mixed, wet pulverized to an average particle size of 4 jam as a volume average particle size, to obtain an aqueous suspension agrochemical composition of the present invention containing 20% by mass of pyribencarb. Thus obtained aqueous suspension agrochemical composition had a viscosity higher than 1,000 mPa·s and exhibited gel-like state with almost no fluidity. The composition was completely solidified on the day after production, and impossible to be used as a liquid agrochemical preparation.

Comparative Example 7

Pyribencarb (20 parts), polyoxyethylene/polyoxypropylene alkylether (average carbon atoms of aliphatic alcohol residue=9, average oxyethylene groups=9, average oxypropylene groups=4.5, 2 parts), propylene glycol (10 parts), xanthan gum (0.25 parts), and water (67.75 parts) were mixed, wet pulverized to an average particle size of 4 μm as a volume average particle size, to obtain an aqueous suspension agrochemical composition containing 20% by mass of pyribencarb. Thus obtained aqueous suspension agrochemical composition had a viscosity higher than 1,000 mPa·s and exhibited gel-like state with almost no fluidity. The composition was completely solidified on the day after production, and impossible to be used as a liquid agrochemical preparation.

Test Example 1

Wheat seeds (variety: Norin No. 61) were sowed in each 5 cm×5 cm polyvinyl chloride pot (9 seeds/pot) and grown for 8 days in a greenhouse. The aqueous suspension agrochemical compositions of Examples 1 to 3 and Comparative Example 1 were diluted 8,000 times with water and sprayed at 20 mL/$m^2$ or 100 mL/$m^2$ (pyribencarb, 5 g/ha or 25 g/ha) onto the area covered with the polyvinyl chloride pots. After air-drying, conidia of wheat powdery mildew (*Erysiphe graminis*) were inoculated, and the plant was placed in a greenhouse at 20 to 25° C. On the day 12 after the inoculation, the disease onset areas of the extending leaves at the time of spraying were indexed and investigated according to the criteria in Table 3 below. Based on the obtained index values, the disease onset rate (%) as well as the control value (%) were further obtained by the following formulae. The results are shown in Table 4.

TABLE 3

| | |
|---|---|
| Disease Onset Index 0 | No disease onset observed |
| Disease Onset Index 1 | Disease onset area of less than 5% of the whole |
| Disease Onset Index 2 | Disease onset area of 5% or more and less than 10% of the whole |
| Disease Onset Index 3 | Disease onset area of 10% or more and less than 25% of the whole |
| Disease Onset Index 4 | Disease onset area of 25% or more of the whole |

$$\text{Disease onset rate (\%)} = \frac{\Sigma\ (\text{Index} \times \text{Number of the relevant leaves})}{\text{Number of leaves investigated} \times 4} \times 100$$

$$\text{Control value (\%)} = \left(1 - \frac{\text{Disease onset rate in treated region}}{\text{Disease onset rate in untreated region}}\right) \times 100$$

TABLE 4

| Sample composition | Amount of pyribencarb used for treatment (g/ha) | Control value (%) |
|---|---|---|
| Example 1 | 5 | 91.0 |
| Example 2 | 5 | 93.6 |
| Example 3 | 5 | 98.1 |
| Comparative Example 1 | 5 | 51.9 |
| Example 1 | 25 | 100.0 |
| Example 2 | 25 | 99.0 |
| Example 3 | 25 | 100.0 |
| Comparative Example 1 | 25 | 91.0 |

The invention claimed is:

1. An aqueous suspension agrochemical composition comprising:

15 to 30% by mass of pyribencarb as an agrochemically active component, based on the total amount of the composition;

2 to 10% by mass of an adjuvant for the pyribencarb of at least one compound selected from the group consisting of a polyoxyalkylene siloxane, a polyoxyethylene/polyoxypropylene block copolymer and a polyoxyalkylene alkyl ether, based on the total amount of the composition;

2 to 10% by mass of a nonionic-anionic surfactant selected from the group consisting of a polyoxyalkylene aryl ether sulfuric acid salt and a polyoxyalkylene aryl ether phosphoric acid salt, based on the total amount of the composition; and water.

2. The aqueous suspension agrochemical composition according to claim 1, wherein the polyoxyalkylene siloxane is polyoxyethylenepolymethyl polysiloxane.

3. The aqueous suspension agrochemical composition according to claim 1, wherein the polyoxyalkylene siloxane is polyoxyalkylenepentamethyl disiloxane, polyoxyalkyleneheptamethyl trisiloxane, or polyoxyalkylenenonamethyl tetrasiloxane.

4. The aqueous suspension agrochemical composition according to claim 1, wherein a polyoxyalkylene moiety of the polyoxyalkylene alkyl ether is a polyoxyethylene or polyoxyethylene/polyoxypropylene copolymer.

5. The aqueous suspension agrochemical composition according to claim 1, wherein the nonionic-anionic surfactant is a sodium salt, a potassium salt, a calcium salt, a magnesium salt, an ammonium salt, or a substituted primary to quaternary ammonium salt.

6. The aqueous suspension agrochemical composition according to claim 1, wherein the viscosity at 20° C. is 100 to 1,000 mPa·s as measured with a B-type viscometer at rotation speed of 30 rpm.

7. The aqueous suspension agrochemical composition according to claim 6, wherein the viscosity is 200 to 700 mPa·s.

8. A method for spraying the aqueous suspension agrochemical composition according to claim 1 onto a field where an agricultural/horticultural plant grows, comprising spraying the composition onto the field.

9. The aqueous suspension agrochemical composition of claim 1, comprising 4 to 8% by mass of the adjuvant and 4 to 8% by mass of the nonionic-anionic surfactant, based on the total amount of the composition.

* * * * *